(12) United States Patent
Snyder et al.

(10) Patent No.: US 11,281,821 B2
(45) Date of Patent: Mar. 22, 2022

(54) AIRCRAFT COMPONENT QUALIFICATION SYSTEM AND PROCESS FOR TARGET BASED INVENTORY QUALIFICATION

(71) Applicant: United Technologies Corporation, Farmington, CT (US)

(72) Inventors: Daniel A. Snyder, Manchester, CT (US); Kurt R. Heinemann, East Hampton, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 932 days.

(21) Appl. No.: 16/026,586

(22) Filed: Jul. 3, 2018

(65) Prior Publication Data

US 2020/0012750 A1     Jan. 9, 2020

(51) Int. Cl.
*G06F 30/20* (2020.01)
*G06F 111/10* (2020.01)
*G06N 20/00* (2019.01)

(52) U.S. Cl.
CPC ........ *G06F 30/20* (2020.01); *F05D 2220/323* (2013.01); *F05D 2260/81* (2013.01); *G06F 2111/10* (2020.01); *G06N 20/00* (2019.01)

(58) Field of Classification Search
CPC ..... G06F 30/20; G06F 2111/10; G06N 20/00; F05D 2220/323; F05D 2260/81;
(Continued)

(56) References Cited

U.S. PATENT DOCUMENTS 6,802,045 B1   10/2004   Sonderman et al.
6,969,821 B2   11/2005   Mika et al.
(Continued)

FOREIGN PATENT DOCUMENTS

CN   106917641 A   7/2017
GB      2536628 A   9/2016
(Continued)

OTHER PUBLICATIONS

Brown, Jeffrey M. and Ramana V. Grandhi, Reduced-Order Model Development for Airfoil Forced Response, International Journal of Rotating Machinery, Jul. 9, 2007, pp. 1-12, vol. 2008, Article ID 387828, Hindawi Publishing Corporation.
(Continued)

*Primary Examiner* — Kamini S Shah
*Assistant Examiner* — Faraj Ayoub
(74) *Attorney, Agent, or Firm* — Carlson, Gaskey & Olds, P.C.

(57) ABSTRACT

An exemplary method for qualifying a gas turbine engine component includes creating a first set of substantially identical gas turbine engine components via a uniform manufacturing procedure, determining a set of as-manufactured parameters of each gas turbine engine component in the first set of substantially identical gas turbine engine components, determining a variance model of the first set of substantially identical gas turbine engine components, and determining a plurality of predicted response models based at least in part on the variance model, each of the predicted response models corresponding to one of an engine type and an engine assembly, and each of the predicted response models being configured to determine a predicted response of including a gas turbine engine component from the first set of substantially identical gas turbine engine components in the corresponding one of the engine type and the engine assembly. The system then identifies as-manufactured parameters of a second engine component, and applies the as-manufactured parameters of the second engine component to each of the predicted response models, thereby generating a predicted response output from each of the predicted response models. An optimum predicted response from each of the generated predicted response models is identified and the engine type or engine assembly that
(Continued)

corresponds with the optimum predicted response is associated with a unique part identifier of the second engine component.

15 Claims, 6 Drawing Sheets

(58) Field of Classification Search
CPC ............ F05D 2230/00; F05D 2270/70; F05D 2270/71; F05D 2270/11; F05D 2260/80; F05D 2260/82; F05D 2260/821; F01D 5/005; F01D 21/003; F01D 25/00; Y02T 50/60; G01M 15/14; F02C 9/00
USPC ............................................................ 703/2
See application file for complete search history.

(56) References Cited

U.S. PATENT DOCUMENTS

| | | | |
|---|---|---|---|
| 7,926,289 B2 | 4/2011 | Lee et al. | |
| 8,712,739 B2 | 4/2014 | Jiang et al. | |
| 9,816,897 B2 | 11/2017 | Ziarno | |
| 9,818,242 B2 | 11/2017 | Volponi et al. | |
| 2004/0117152 A1* | 6/2004 | Shafer | G06Q 10/06 702/183 |
| 2005/0234586 A1 | 10/2005 | Agapiou et al. | |
| 2008/0015725 A1* | 1/2008 | Eichblatt | G05B 19/41875 700/109 |
| 2014/0208768 A1 | 7/2014 | Bacic | |
| 2017/0132777 A1 | 5/2017 | Durrant et al. | |
| 2017/0315537 A1* | 11/2017 | Singh | F02C 9/20 |
| 2017/0350683 A1* | 12/2017 | Bather | G01B 5/205 |
| 2019/0146470 A1* | 5/2019 | Akkaram | G05B 23/0254 700/30 |

FOREIGN PATENT DOCUMENTS

| | | |
|---|---|---|
| RU | 2016115404 A | 10/2017 |
| WO | 2005013070 | 2/2005 |

OTHER PUBLICATIONS

U.S. Appl. No. 15/956,884, filed Apr. 19, 2018.
The European Search Report for EP Application No. 19183986.9, dated Dec. 6, 2019.
Eger, Florian et al., Part Variation Modeling in Multi-Stage Production Systems for Zero-Defect Manufacturing, 2019 IEEE International Conference on Industrial Technology, Feb. 13, 2019, pp. 1017-1022.

* cited by examiner

AIRCRAFT COMPONENT QUALIFICATION SYSTEM AND PROCESS FOR TARGET BASED INVENTORY QUALIFICATION

TECHNICAL FIELD

The present disclosure relates generally to a process for qualifying manufactured gas turbine engine components, and more specifically to a process for targeting manufactured components to optimized engine environments.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via one or more shaft, the rotation of the turbine section further drives the compressor section to rotate. In some examples, a fan is also connected to the shaft and is driven to rotate via rotation of the turbine as well.

Any given gas turbine engine is constructed of a significant number of individually manufactured components. Among the individually manufactured components can be blades, vanes, panels, outer air seals, and the like. In some cases, such as with a compressor rotor or a fan, multiple substantially identical components can be utilized in a single engine assembly. During manufacture of such components it is possible for one or more parameter of the component to be out of specification, resulting in a sub-optimal or an unusable component.

SUMMARY OF THE INVENTION

An exemplary method for qualifying a gas turbine engine component includes creating a first set of substantially identical gas turbine engine components via a uniform manufacturing procedure, determining a set of as-manufactured parameters of each gas turbine engine component in the first set of substantially identical gas turbine engine components, determining a variance model of the first set of substantially identical gas turbine engine components, wherein the variance model is a mathematical representation of a plurality of characteristics of the substantially identical gas turbine engine components in the first set of substantially identical gas turbine engine components, the characteristics describing variations between the substantially identical gas turbine engine components within the first set of substantially identical gas turbine engine components, determining a plurality of predicted response models based at least in part on the variance model, each of the predicted response models corresponding to one of an engine type and an engine assembly, and each of the predicted response models being configured to determine a predicted response of including a gas turbine engine component from the first set of substantially identical gas turbine engine components in the corresponding one of the engine type and the engine assembly, identifying as-manufactured parameters of a second engine component, the second engine component being substantially identical to components in the first set of substantially identical gas turbine engine components and being constructed via the uniform manufacturing procedure, and applying the as-manufactured parameters of the second engine component to each of the predicted response models, thereby generating a predicted response output from each of the predicted response models, and identifying an optimum predicted response from each of the generated predicted response models and associating the engine type or engine assembly that corresponds with the optimum predicted response with a unique part identifier of the second engine component.

Another example of the above described method for qualifying a gas turbine engine component further includes installing the second engine component in the one of the engine type or engine assembly corresponding with the optimum predicted response.

In another example of any of the above described methods for qualifying a gas turbine engine component installing the second engine component in the one of the engine type or engine assembly comprises installing the second engine component as a replacement part.

In another example of any of the above described methods for qualifying a gas turbine engine component the one of the engine type or engine assembly is an engine assembly, and wherein the corresponding predicted response model is based at least in part on as manufactured parameters of the engine assembly.

In another example of any of the above described methods for qualifying a gas turbine engine component the corresponding predicted response model is based at least in part on at least one of an engine age, engine flight time, environment exposure, original condition, and an engine run time, of the engine assembly.

In another example of any of the above described methods for qualifying a gas turbine engine component the one of the engine type or engine assembly is an engine type, and wherein the corresponding predicted response model is based at least in part on one of a set of design parameters for the engine type and an as measured exemplary engine of the engine type.

In another example of any of the above described methods for qualifying a gas turbine engine component the second engine component is an engine component in the first set of substantially identical gas turbine engine components.

In another example of any of the above described methods for qualifying a gas turbine engine component the second engine component is substantially identical to each gas turbine engine component in the first set of substantially identical gas turbine engine components.

In another example of any of the above described methods for qualifying a gas turbine engine component the second engine component is manufactured via the uniform manufacturing procedure.

In another example of any of the above described methods for qualifying a gas turbine engine component each component in the first set of substantially identical gas turbine engine components includes an airfoil.

In one exemplary embodiment a system for qualifying a gas turbine engine component includes a computer system configured to receive a set of as-manufactured parameters of a first set of substantially identical gas turbine engine components and determine a variance model and a plurality of predicted response models, each of the variance model and the plurality of predicted response models being based at least in part on the as-manufactured parameters of the first set of substantially identical gas turbine engine components, wherein each of the predicted response models corresponds to one of an engine type and a specific engine assembly, the computer system being further configured to receive a second set of as-measured parameters of a second gas turbine engine component, apply the second set of parameters to each predicted response model in the plurality of predicted response models, and generate a predicted response of the second gas turbine engine component corresponding to each of the predicted response models, identify an engine type or engine assembly corresponding to a best predicted response of the generated predicted response, and correlate a unique gas turbine engine component identifier with the identified engine type or engine assembly, thereby identifying the optimum usage of the second gas turbine engine component.

In another example of the above described system for qualifying a gas turbine engine component the second gas turbine engine component is an engine component in the first set of substantially identical gas turbine engine components.

In another example of any of the above described systems for qualifying a gas turbine engine component the second gas turbine engine component is substantially identical to each gas turbine engine component in the first set of substantially identical gas turbine engine components.

In another example of any of the above described systems for qualifying a gas turbine engine component the set of substantially identical gas turbine engine components are manufactured using a uniform manufacturing technique.

In another example of any of the above described systems for qualifying a gas turbine engine component the second gas turbine engine component is manufactured via the uniform manufacturing procedure.

In another example of any of the above described systems for qualifying a gas turbine engine component each component in the first set of substantially identical gas turbine engine components includes an airfoil.

In another example of any of the above described systems for qualifying a gas turbine engine component the set of as-measured parameters of the first set of substantially identical gas turbine engine components includes at least one of a chord dimension, a radial span length, a thickness, a contour, a circumferential pitch, a stacking axis, a stagger angle, a sweep angle, a dihedral angle, and a surface shape in an X, Y, Z coordinate system.

In another example of any of the above described systems for qualifying a gas turbine engine component the set of as-manufactured parameters of the first set of substantially identical gas turbine engine components includes each of the chord dimension, the radial span length, the thickness, the contour, the circumferential pitch, the stacking axis, the stagger angle, the sweep angle, the dihedral angle, and the surface shape in an X, Y, Z coordinate system.

In another example of any of the above described systems for qualifying a gas turbine engine component the system is configured to provide the correlated unique gas turbine engine component identifier and the identified engine type or engine assembly to a manufacturing process, thereby ensuring that the second gas turbine engine component is installed in the identified engine type or engine assembly.

In another example of any of the above described systems for qualifying a gas turbine engine component each predicted response model is based at least in part on as manufactured parameters of a corresponding engine assembly, and wherein the as manufactured parameters include at least one of an engine age, engine flight time, environment exposure, original condition, and an engine run time, of the corresponding engine assembly.

These and other features of the present invention can be best understood from the following specification and drawings, the following of which is a brief description.

DETAILED DESCRIPTION OF AN EMBODIMENT

Figure 1:
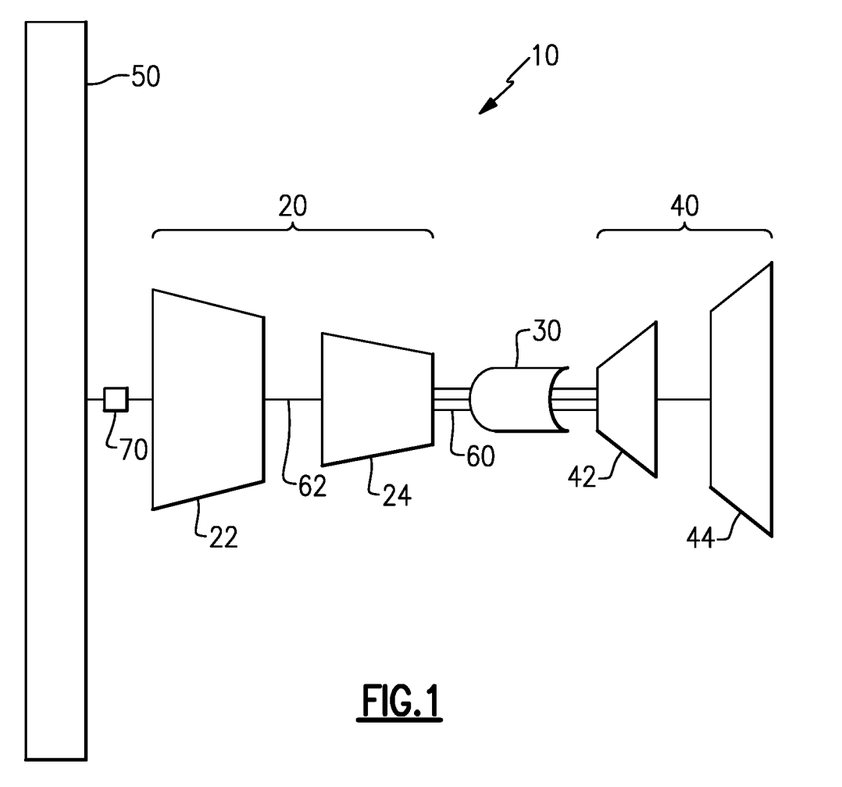
FIG. 1 illustrates a high level schematic view of an exemplary gas turbine engine.

FIG. 1 schematically illustrates a gas turbine engine 10 including a compressor section 20, a combustor section 30, and a turbine section 40. Positioned fore of the compressor section 20 is a fan 50. The compressor section 20 includes a low pressure compressor 22 and a high pressure compressor 24. Similarly, the turbine section 40 includes a high pressure turbine 42 and a low pressure turbine 44. The high pressure turbine 42 is connected to the high pressure compressor 24 via a first shaft 60 and rotation of the high pressure turbine 42 drives rotation of the high pressure compressor 24. Similarly, the low pressure compressor 22 is connected to the low pressure turbine 44 via a second shaft 62 and the rotation of the low pressure turbine 44 drives rotation of the low pressure compressor 22. In the example engine 10 of FIG. 1, the fan 50 is connected to, and driven by, the first shaft 62 via a gear system 70.

One of skill in the art will appreciate that in alternative examples, an alternative number of turbines 42, 44 and compressors 22, 24 can be utilized and still achieve similar results. Similarly, the fan 50 can be driven via a direct connection to the shaft 62 instead of the geared system 70, or driven in any other known manner.

Each of the fan 50, the compressors 22, 24 and the turbines 42, 44 are constructed from multiple substantially identical components which can include rotor blades, vanes, blade outer air seals, and the like. Each component is constructed according to a set of multiple design parameters. Each of those design parameters is given a range of acceptable values to account for manufacturing variations, as well as tolerances with the engine structure.

Existing component qualification systems determine the as-manufactured dimensions of each manufactured component, compare the measured dimensions of the manufactured component to the design dimensions, including tolerances, and determine that the component is "acceptable" when every parameter falls within the as designed specification. The type of manufacturing process used to make the part, and the relationship between each measured parameter and each other measured parameter is not included within the existing analysis. In some examples, such as those where the manufacture of each component is particularly expensive, unqualified components are manually reviewed to determine if the component may still be acceptable for use within an engine despite including one or more parameter that is outside of the as designed tolerances. In alternative examples, the unqualified component can be scrapped or reworked to meet tolerances.

Figure 2A:
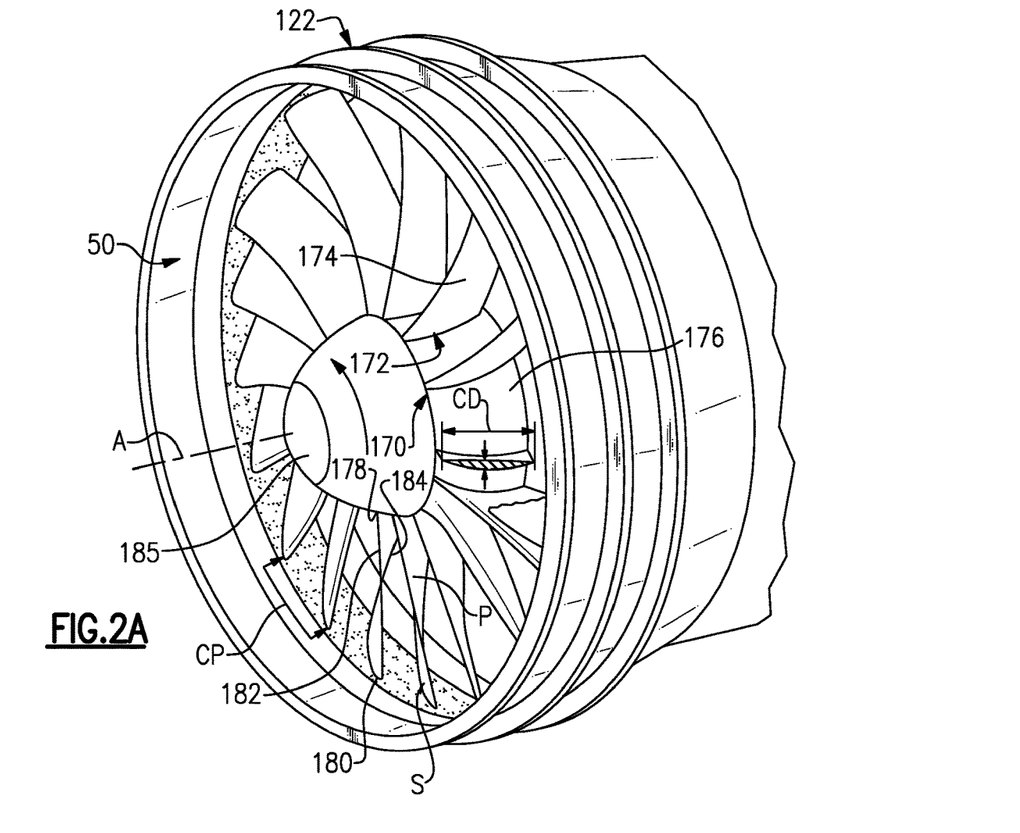
FIG. 2A is a perspective view of a fan section of the engine of FIG. 1.
Figure 2B:
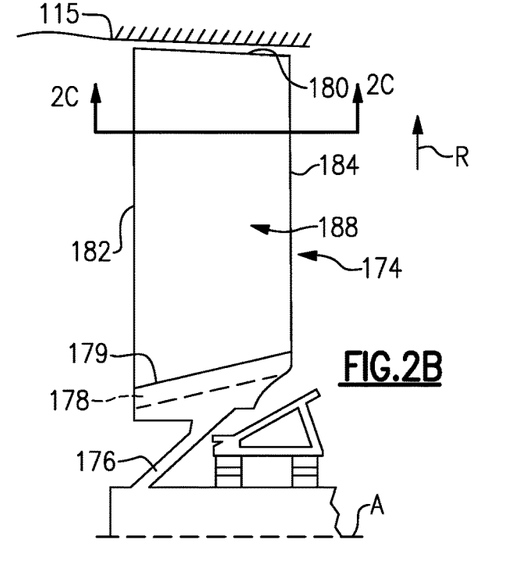
FIG. 2B is a schematic cross-sectional view of the fan section of FIG. 2A.
Figure 2C:
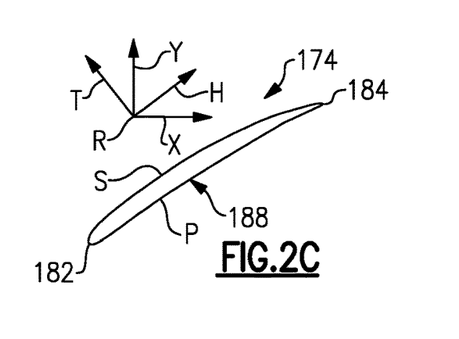
FIG. 2C is a schematic view of a cross-section of an airfoil of FIG. 2B sectioned at a particular span position and depicting directional indicators.

One such structure in the example of FIG. 1 is the fan 50. Referring to FIGS. 2A-2C, the fan 50 includes a rotor 170 having an array or row 172 of airfoils or blades 174 that extend circumferentially around, and are supported by, the fan hub 176. Any suitable number of fan blades 174 may be used in a given application. The hub 176 is rotatable about the engine axis A. The array 172 of fan blades 174 are positioned about the axis A in a circumferential or tangential direction Y. Each of the blades 174 includes an airfoil body that extends in a radial span direction R from the hub 176 between a root 178 and a tip 180, in a chord direction H (axially and circumferentially) between a leading edge 182 and a trailing edge 184 and in a thickness direction T between a pressure side P and a suction side S.

Each blade 174 has an exterior surface 188 providing a contour that extends from the leading edge 182 aftward in a chord-wise direction H to the trailing edge 184. The exterior surface 188 of the fan blade 174 generates lift based upon its geometry and directs flow along the core flow path and bypass flow path. The fan blade 174 may be constructed from a composite material, or an aluminum alloy or titanium alloy, or a combination of one or more of these. Abrasion-resistant coatings or other protective coatings may be applied to the fan blade 174.

A chord, represented by chord dimension (CD), is a straight line that extends between the leading edge 182 and the trailing edge 184 of the blade 174. The chord dimension (CD) may vary along the span of the blade 174. The row 172 of blades 174 also defines a circumferential pitch (CP) that is equivalent to the arc distance between the leading edges 182 or trailing edges 184 of neighboring blades 174 for a corresponding span position. The root 178 is received in a correspondingly shaped slot in the hub 176. The blade 174 extends radially outward of a platform 179, which provides the inner flow path. The platform 179 may be integral with the blade 174 or separately secured to the hub 176, for example. A spinner 185 is supported relative to the hub 176 to provide an aerodynamic inner flow path into the fan section 122.

Figure 3A:
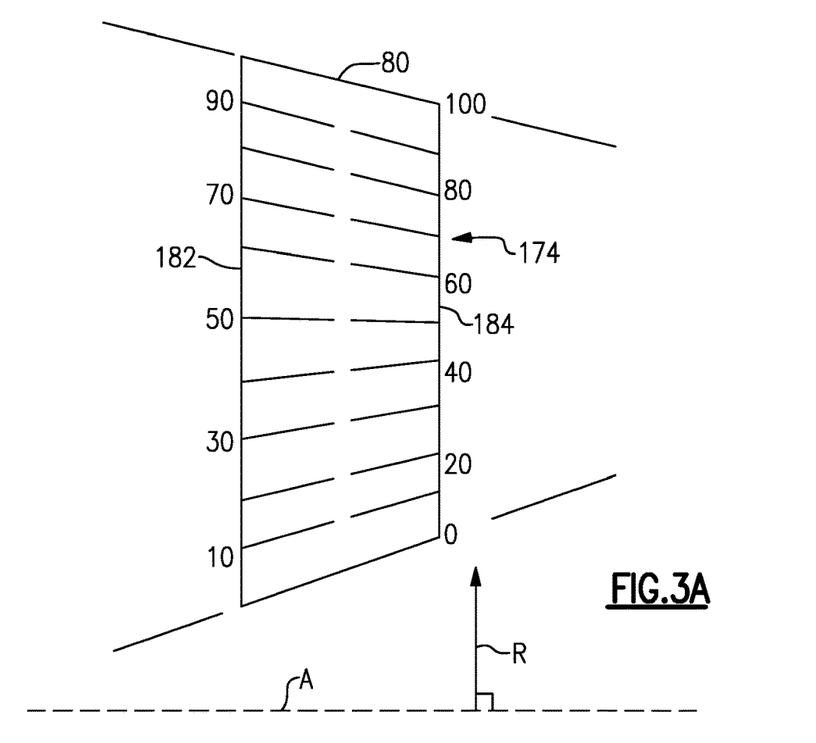
FIG. 3A is a schematic view of airfoil span positions.
Figure 3B:
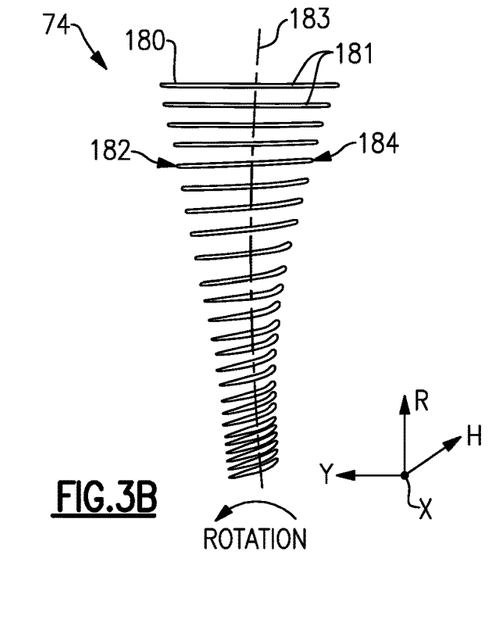
FIG. 3B is a perspective view of sections of the airfoil of FIG. 2A at various span positions.

Referring to FIGS. 3A-3B, span positions are schematically illustrated from 0% to 100% in 10% increments to define a plurality of sections 181. Each section at a given span position is provided by a conical cut that corresponds to the shape of segments the bypass flowpath or the core flow path, as shown by the large dashed lines (shown in FIG. 3A). In the case of a fan blade 174 with an integral platform, the 0% span position corresponds to the radially innermost location where the airfoil meets the fillet joining the airfoil to the platform 179. In the case of a fan blade 174 without an integral platform, the 0% span position corresponds to the radially innermost location where the discrete platform 179 meets the exterior surface of the airfoil (shown in FIG. 2B). A 100% span position corresponds to a section of the blade 174 at the tip 80.

In some examples, each of the blades 174 defines a non-linear stacking axis 183 (shown in FIG. 3B) in the radial direction R between the tip 180 and the inner flow path location or platform 179. For the purposes of this disclosure, "stacking axis" refers to a line connecting the centers of gravity of airfoil sections 181. In some examples, each fan blade 174 is specifically twisted about a spanwise axis in the radial direction R with a corresponding stagger angle at each span position and is defined with specific sweep and/or dihedral angles along the airfoil 174. Airfoil geometric shapes, stacking offsets, chord profiles, stagger angles, sweep, dihedral angles, and surface shape in an X, Y, Z coordinate system, among other associated features, can be incorporated individually or collectively to improve characteristics such as aerodynamic efficiency, structural integrity, and vibration mitigation, for example.

Figure 3C:
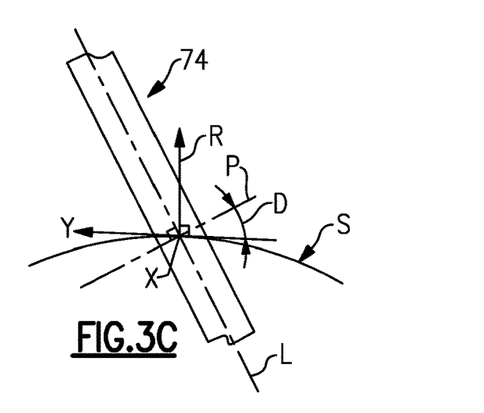
FIG. 3C is a schematic representation of a dihedral angle for an airfoil.

In some examples, the airfoil 174 defines an aerodynamic dihedral angle D (simply referred to as "dihedral") as schematically illustrated in FIG. 3C. An axisymmetric stream surface S passes through the airfoil 174 at a location that corresponds to a span location (FIG. 3A). For the sake of simplicity, the dihedral D relates to the angle at which a line L along the leading or trailing edge tilts with respect to the stream surface S. A plane P is normal to the line L and forms an angle with the tangential direction Y, providing the dihedral D. A positive dihedral D corresponds to the line tilting toward the suction side (suction side-leaning), and a negative dihedral D corresponds to the line tilting toward the pressure side (pressure side-leaning).

As can be seen, each individual fan blade 174 defines multiple parameters such as chord dimension, radial span length, thickness, contour, circumferential pitch, stacking axis, stagger angle, sweep angle, and dihedral angle. Further, many of the example parameters as well as additional parameters can be required to meet tolerances at each of multiple span positions resulting in a substantial number of parameters, any one of which can disqualify the fan blade 174 if it is out of tolerance range under existing manufacturing processes. While described above with regards to the fan 50, and individual fan blades 174, it should be understood that similar parameters exist for any given blade and/or vane utilized through the engine 10, including those within the compressor section 20, and the turbine section 40. Further, any number of other engine components can have similar numbers of parameters, all of which must be within tolerance, even if the parameters of the given component are not the same as the airfoil parameters described above.

Under current manufacturing processes, if any of the above described parameters, or any similar parameters that may be necessary for a given component, are out of tolerance at any single point the component will fail inspection (be disqualified) and either scrapped or provided to an engineering team for manual review. Further it should be understood that the above described parameters are merely exemplary parameters of a fan blade 174, and practical components can include more and different parameters that are subjected to the same level of analysis when qualifying the component.

With reference to each of FIGS. 1-3C, disclosed herein is an improved system and process for qualifying manufactured parts based on the totality of the part configuration, rather than individually based on each parameter at each location on the component. In some examples, one or more parameter may be out of tolerance, but when the component is considered as a whole it will still be an acceptable configuration. Further exacerbating this is the fact that different manufacturing techniques for any given component (e.g. additive manufacturing vs. casting) can result in different acceptable configurations that may include one or more parameter outside of the as designed tolerances.

With continued reference to FIGS. 1-3C, FIG. 4 schematically illustrates an exemplary system 300 for developing and analyzing a batch of manufactured parts in order to qualify individual parts. Initially a batch of parts are manufactured using a single manufacturing process or uniform combination of processes in a manufacture parts step 310. Once a full batch of the parts has been manufactured, each parameter of each of the parts is measured in an inspect parts step 320. The output of the inspect parts step 320 is a data set that includes a measurement of each parameter of each part in the manufacturing run. The as-manufactured data set is then provided to a computer system and is used by the computer system to train a part analysis in a "train analysis system" step 330 within the train analysis step 330. The computer system develops a variance model that models the variations of an average, or exemplary part, for the specific manufacturing process or processes based on the set of measured as-manufactured parts. Contemporaneously with the variance model, the computer system develops a predictive model, that can predict the behavioral characteristics, such as efficiency, bending, vibration, etc. of a given component based on the specific parameters of that component and the engine in which the component is to be included.

Figure 4:
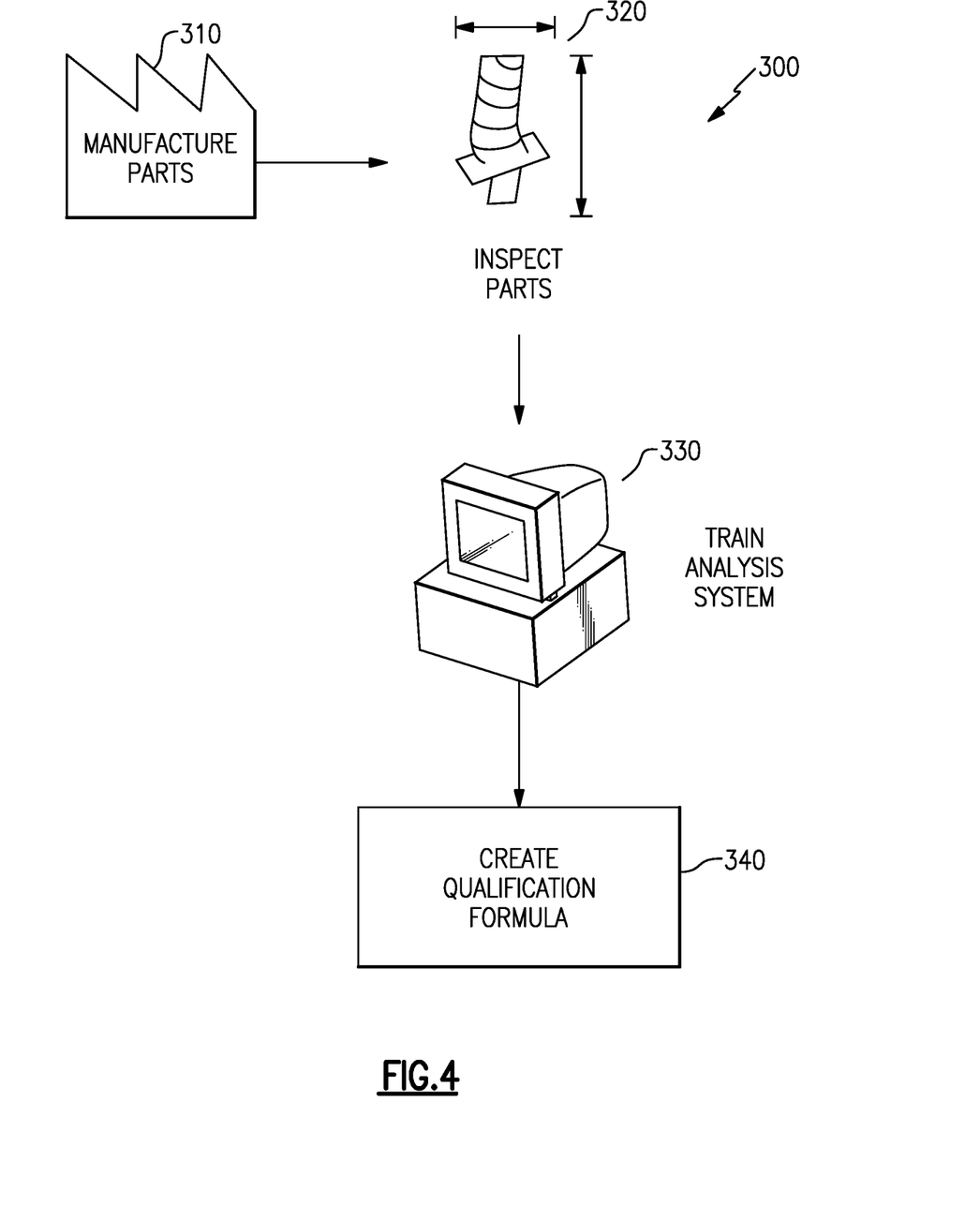
FIG. 4 schematically illustrates an exemplary system for developing and analyzing a batch of manufactured parts in order to qualify individual parts.

The variation model is a dimension reducing model, and describes a large number of observable variables' values using a smaller number of independent, latent variables. A latent variable is a variable whose value depends on our understanding of the latent structure inside the observed data. The latent structure of the data can only be determined from correlation analysis of the observed variables, and the correlation analysis requires observations of multiple as-manufactured parts. The usage of the as-manufactured measurements of the batch of components to create the variance model and the predictive model can be referred to as a principal component analysis (PCA). In some examples, the predictive model is a Gaussian Process (GP) model.

Based on the predictive model, and the variance model, the computer system then creates a qualification formula in a "create qualification formula" step 340. The qualification formula is a function, or set of functions, that define an acceptable component based on all of its parameters instead of being based on each parameter's individual tolerances. Due to the number of parameters (in some cases the number of parameters can exceed 20), and the number of positions on the part where each parameter is to be measured, the functions determined by the computer system are high order functions, and determining whether an individual component meets the functions would be prohibitively time consuming if performed manually.

In some examples, such as the example discussed above, the determined qualification formula is a generic formula used to qualify whether an as-manufactured part is acceptable for utilization in engines of the type the part is manufactured for. In such a system any qualified component is deemed acceptable for use in a corresponding engine, or engines, and the components are utilized on an as-available basis. In other words, once qualified each component of a given type is treated interchangeably with each other component of the given type.

In some examples, such as those where a single component type is utilized within multiple distinct engine constructions or where the multiple engines of the same construction are being assembled simultaneously, the qualification formula can be further adapted to optimize the process by further determining which type of engine construction, or which engine assembly of a single type of construction, is best suited for a given as-manufactured engine component. As an alternative to adapting the initial qualification formula, some examples utilize an optimization formula subsequent to an initial qualification.

In either alternative, such a consideration is referred to as optimized component targeting, and treats each as-manufactured component as a unique entity, rather than as a fungible product. Optimized component targeting is particularly beneficial for gas turbine engine components where there are substantial numbers of the same component included within the gas turbine engine. By way of example, airfoil components such as blades and vanes can have several iterations of a single blade or vane component included within a single engine construction.

Once a component has been identified as optimal for a given engine type or a given engine assembly or construction, the computer system flags the specific component for that particular engine type or engine assembly and the component is installed in the corresponding engine or engine type as needed. By flagging individual components as optimal for specific engines or engine assemblies, technicians can utilize the best suited component for any given assembly, rather than treating all qualified components as identical. This further improves efficiencies and operations of any engine constructed using components that have been optimally targeted in the manner described herein.

In some examples, the optimized component targeting can be performed as an additional step after the as-manufactured component is qualified via the qualification formula generated at step 340. With continued reference to FIGS. 1-4, FIG. 5 schematically illustrates one such system 400. Initially, each as-manufactured component is processed through the qualification formulas determined at step 340 (FIG. 4) to determine if the component is qualified or unqualified in a "qualify component" step 410.

Figure 5:
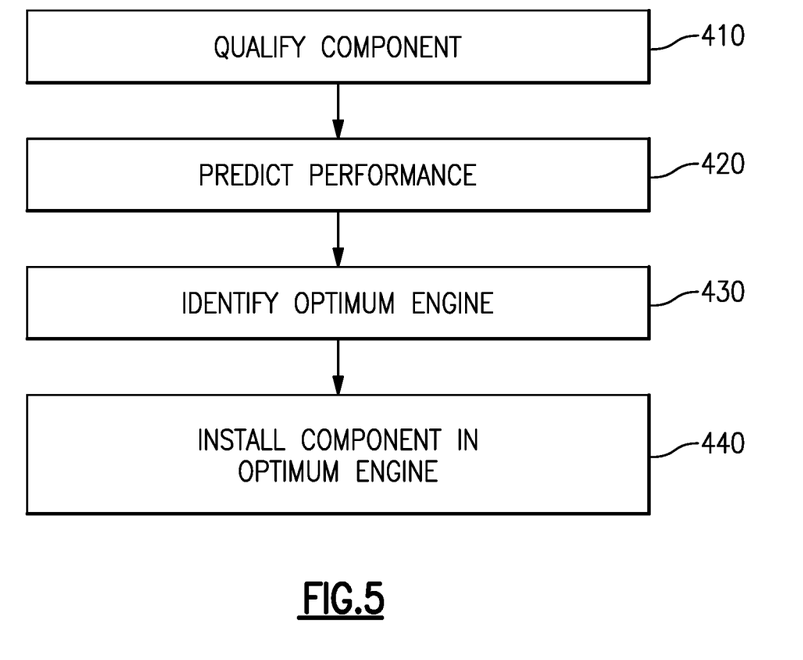
FIG. 5 illustrates a process for identifying an optimum engine or engine type for a given as-manufactured component.

Once qualified, the as-manufactured data of a qualified component is provided to predicted operations models of each engine or of each engine type in a "predict performance" step 420. The predictive models include one or more functions that determine a predicted operational response of the as-manufactured component under parameters defined by the specific engine or engine type. In examples where the optimized component targeting is being directed to targeting between different engine types for a shared component, a predictive model based on a generic version of each engine type can be utilized to determine the predicted response of the as-manufactured component in each of the engine types. The generic version can be a purely theoretical mathematical model, data from an exemplary construction that has been bench tested, and/or a combination of the two.

In alternative examples, where the as-manufactured component is to be included within one of multiple specific engines of the same construction type, the predictive models include specific as-manufactured details of the engines being targeted between. In such an example, the predictive models include specific as-manufactured dimensions of the engines, or of relevant portions of the engines rather than as designed specifications as in the example of the engine types.

By way of example, each predictive model can include simulations that predict: functions of robustness, such as stress, vibration, fatigue, or stall margin, functions of performance, such as efficiency, flow capacity, or functions of desirable characteristics, such as erosion/foreign object damage (FOD) resistance, smoothness, or coating quality. These predictions are operated via evaluation of the functional model via computer system and can be determined via any statistical or mathematical modeling technique.

Once the predicted responses of including the as-manufactured component in each engine or engine type have been determined by the predictive models corresponding to each engine or engine type, the system compares the outputs for the as-manufactured component from each predictive model against each other predictive model. This comparison determines which predictive model the as-manufactured component had an optimum response in, and thus which engine or engine type the as-manufactured component is optimized for, and identifies the engine or engine type corresponding to the model with the optimum response in an "identify optimum engine" step 430.

In one example, the optimum engine can be determined by providing a set of target values for each parameter of the as-manufactured component, with each target value corresponding to one of the engines or engine types. The comparison determines which engine or engine type has a target value for a given parameter that is closest to the predicted value of the parameter for that as-manufactured component. The identified engine is the optimum engine for that particular parameter. In alternative examples, the optimization can be with regards to one specific parameter (e.g. durability) and the engine in which the as-manufactured component achieves the best performance of that parameter is identified as the optimum engine.

One of skill in the art will additionally appreciate that optimization can include determining trade-offs where one parameter performs better in a first engine and a second parameter performs better in a second engine for a single as-manufactured component. As a result, the identification of the optimum engine for a given part can include assigning a weight to each optimization parameter for each engine or engine type. The assigned weight corresponds to the importance of the corresponding parameter to the overall performance of the engine. A weighted average of the variance of each parameter from the corresponding optimum value of the corresponding engine or engine type is then determined. The weighted average is referred to as an optimization value. The engine or engine type having the highest optimization value is determined to be the optimum engine or engine type for the inclusion of the as-manufactured component.

Once the optimum engine is identified, the computer system associates a unique identifier, such as a part serial number, of the as-manufactured component with the optimal engine type or engine assembly and stores the identified optimum engine type or engine assembly in an inventory database. Finally, the component is passed to a manufacturing process and installed in the corresponding optimum engine in an "Install Component in Optimum Engine" step 440.

A further benefit of the optimized component targeting is the optimization of replacement parts for existing engines. When manufacturing replacement parts for engine types, the same qualification processes described above can be applied, and the replacement parts can be flagged as optimum for specific existing engines. In this example, a predictive model for each engine is generated according to any predictive modeling technique, with each predictive model reflecting the as-manufactured characteristics of the corresponding engine, as well as additional factors such as age, flight time, flight distance, environment exposure, and original condition. The as-manufactured parameters of the component being qualified can then be applied to each of the predictive models. Based on the output of the predictive models and the qualification formula, the computer system identifies which of the existing engines the as-manufactured component is optimum for inclusion as a replacement part.

In yet further examples, the identify optimum engine step 430 can include a grading of types of engines from most optimal to least optimal. In such an example, the identify optimum engines identifies all engines above a certain optimum threshold as being engines in which the as-manufactured component can be optimally included, and all engines below the threshold as engines in which the as-manufactured component can be included as standard quality. In other words, the as-manufactured component performs more optimally in the engines or engine types identified as optimal, and performs up to expectations in the remaining engines or engine types that it is qualified for. By using this graded qualification, an optimal part can be used when a customer or engine requires above a certain level of performance and/or when an optimum as-manufactured component is available. Alternatively a standard quality as-manufactured component can be used when optimal performance is not required or when an optimal as-manufactured component is not available.

While described above with regards to optimization of performance, it is appreciated that any other type of optimization including durability, longevity, strength, etc. can be identified via the same process. The final identification of an optimum engine and installation of a component within the optimum engine can be directed toward any of the parameters, or a combination of them.

Figure 6:
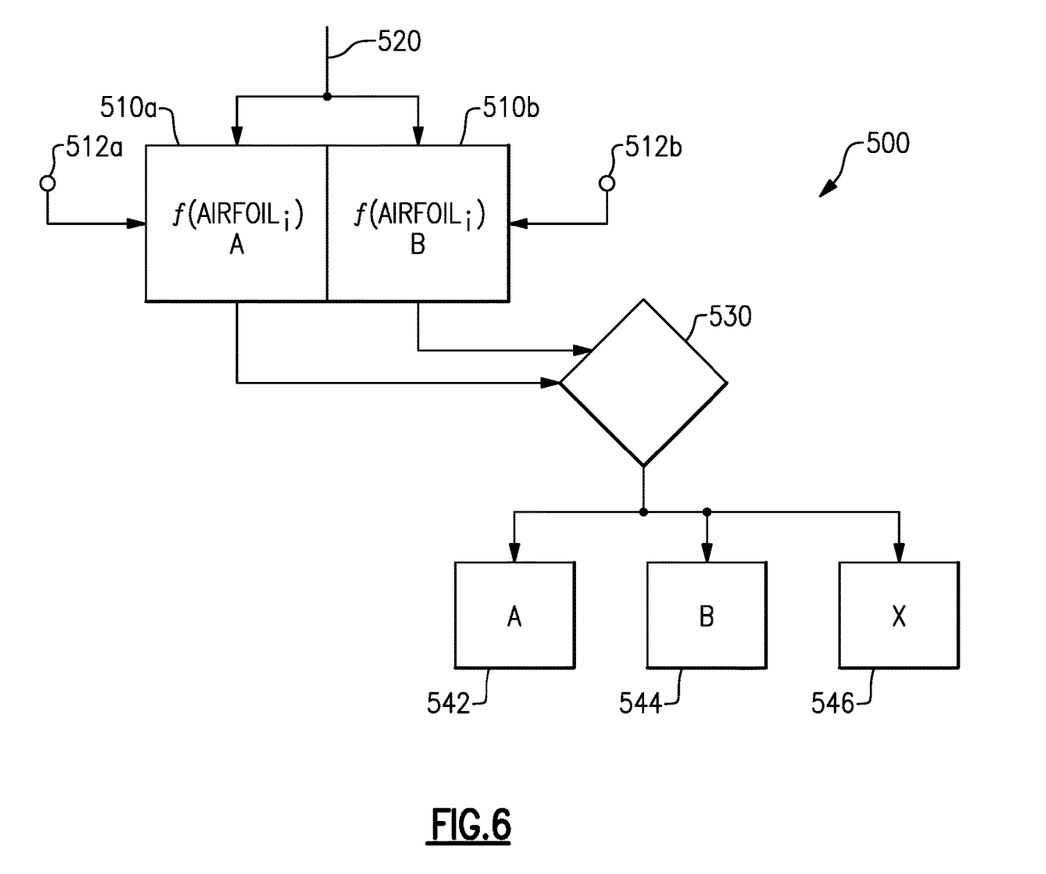
FIG. 6 schematically illustrates a qualification process for qualifying an as-manufactured component and identifying an optimum targeted engine for the component simultaneously.

While described above with regards to a distinct operation, one of skill in the art will appreciate that the initial predictive models established in the train analysis step 330, of FIG. 4, as well as the initial qualification formula can include the features described with regards to the predict performance step 420 and the identify optimum engine step 430. Such an example qualification process 500 is illustrated in FIG. 6. In the example process 500 of FIG. 6, predictive models 510a, 510b are generated in the train analysis step 330, and provided to the qualification process 500 via inputs 512a, 512b. The inputs 512a, 512b can be physical inputs to a distinct computer system performing the qualification process, or non-physical data inputs received from another program operating on the same computer system, or any similar structure.

Each of the predictive models 510a, 510b receives an as-manufactured component specification 520, and the predictive models 510a, 510b run a simulation of the corresponding engine (A, B) incorporating the as-manufactured component. The results of each simulation is provided to a qualification decision 530. The qualification decision first checks to ensure that the results of the predictive models 510a, 510b and the as-manufactured parameters of the component meet a minimum standard of acceptability. If the as-manufactured component does not meet the minimum standard of acceptability, the component is identified as unqualified 546 as is either flagged for manual re-evaluation by an engineering team or scrapped.

If the as-manufactured component and the outputs of the predictive models 510a, 510b meet the minimum standard of acceptability, the qualification formula determines which of the engines 542, 544 (A or B) the as-manufactured component has a better performance in. The identified engine 542, 544 is correlated with the serial number (or other unique identifier) of the as-manufactured component and stored as the optimum target for the component.

While illustrated and described with regards to two distinct engines 542, 544, it is appreciated that the process can be expanded to include any number of engines or engine types and still fall within the scope of this disclosure.

By using the process described herein, the number of blades that can be qualified without requiring additional engineering analysis can be increased, thereby reducing the time and expenditure required to qualify parts, as well as further reducing waste or scrap parts by decreasing the number of components that are disqualified.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for qualifying a gas turbine engine component comprising:
   creating a first set of identical gas turbine engine components via a uniform manufacturing procedure, the first set of identical gas turbine engine components include an airfoil;
   determining a set of as-manufactured parameters of each gas turbine engine component in the first set of identical gas turbine engine components;
   determining a variance model of the first set of substantially identical gas turbine engine components, wherein the variance model is a mathematical representation of a plurality of characteristics of the identical gas turbine engine components in the first set of identical gas turbine engine components, the characteristics describing variations between the identical gas turbine engine components within the first set of identical gas turbine engine components;
   determining a plurality of predicted response models based at least in part on the variance model, each of the predicted response models corresponding to one of an engine type and an engine assembly, and each of the predicted response models being configured to determine a predicted response of including a gas turbine engine component from the first set of identical gas turbine engine components in the corresponding one of the engine type and the engine assembly;
   identifying as-manufactured parameters of a second engine component, the second engine component being identical to components in the first set of identical gas turbine engine components and being constructed via the uniform manufacturing procedure, and applying the as-manufactured parameters of the second engine component to each of the predicted response models, thereby generating a predicted response output from each of the predicted response models; and
   identifying an optimum predicted response from each of the generated predicted response models and associating the engine type or engine assembly that corresponds with the optimum predicted response with a unique part identifier of the second engine component, and installing the second engine component in the one of the engine type or engine assembly corresponding with the optimum predicted response as a replacement part.

2. The method of claim 1, wherein the one of the engine type or engine assembly is an engine assembly, and wherein the corresponding predicted response model is based at least in part on as manufactured parameters of the engine assembly.

3. The method of claim 2, wherein the corresponding predicted response model is based at least in part on at least one of an engine age, engine flight time, environment exposure, original condition, and an engine run time, of the engine assembly.

4. The method of claim 1, wherein the one of the engine type or engine assembly is
   an engine type, and wherein the corresponding predicted response model is based at least in part on one of a set of design parameters for the engine type and an as measured exemplary engine of the engine type.

5. The method of claim 1 wherein the second engine component is an engine component in the first set of identical gas turbine engine components.

6. The method of claim 1, wherein the second engine component is identical to each gas turbine engine component in the first set of identical gas turbine engine components.

7. The method of claim 6, wherein the second engine component is manufactured via the uniform manufacturing procedure.

8. A system for qualifying a gas turbine engine component comprising:
   a computer system configured to receive a set of as-manufactured parameters of a first set of identical gas turbine engine components and determine a variance model and a plurality of predicted response models, each of the variance model and the plurality of predicted response models being based at least in part on as-manufactured parameters of the first set of identical gas turbine engine components, wherein each of the predicted response models corresponds to one of an engine type and a specific engine assembly;
   wherein each component in the first set of identical gas turbine engine components includes an airfoil;
   the computer system being further configured to receive a second set of as-measured parameters of a second gas turbine engine component, apply the second set of parameters to each predicted response model in the plurality of predicted response models, and generate a predicted response of the second gas turbine engine component corresponding to each of the predicted response models;
   identify an engine type or engine assembly corresponding to a best predicted response of the generated predicted response;
   correlate a unique gas turbine engine component identifier with the identified engine type or engine assembly, thereby identifying the optimum usage of the second gas turbine engine component; and
   provide the correlated unique gas turbine engine component identifier and the identified engine type or engine assembly to a manufacturing process, thereby ensuring that the second gas turbine engine component is installed in the identified engine type or engine assembly.

9. The system of claim 8, wherein the second gas turbine engine component is an engine component in the first set of identical gas turbine engine components.

10. The system of claim 8, wherein the second gas turbine engine component is identical to each gas turbine engine component in the first set of identical gas turbine engine components.

11. The system of claim 8, wherein the set of identical gas turbine engine components are manufactured using a uniform manufacturing technique.

12. The system of claim 11, wherein the second gas turbine engine component is manufactured via the uniform manufacturing procedure.

13. The system of claim 8, wherein the set of as-measured parameters of the first set of identical gas turbine engine components includes at least one of a chord dimension, a radial span length, a thickness, a contour, a circumferential pitch, a stacking axis, a stagger angle, a sweep angle, a dihedral angle, and a surface shape in an X, Y, Z coordinate system.

14. The system of claim 13, wherein the set of as-manufactured parameters of the first set of substantially identical gas turbine engine components includes each of the chord dimension, the radial span length, the thickness, the contour, the circumferential pitch, the stacking axis, the stagger angle, the sweep angle, the dihedral angle, and the surface shape in the X, Y, Z coordinate system.

15. The system of claim 8, wherein each predicted response model is based at least in part on as manufactured parameters of a corresponding engine assembly, and wherein the as manufactured parameters include at least one of an engine age, engine flight time, environment exposure, original condition, and an engine run time, of the corresponding engine assembly.

\* \* \* \* \*